United States Patent [19]

Grimes et al.

[11] Patent Number: 5,212,578
[45] Date of Patent: May 18, 1993

[54] SELECTION OF TRANSMISSION FACILITIES USING OPTICAL WAVELENGTH DIVISION MULTIPLEXING

[75] Inventors: Gary J. Grimes, Thornton; John S. Helton, Louisville; William K. Honea, Denver; Stephen R. Peck, Boulder, all of Colo.

[73] Assignee: AT&T Bell Laboratories, Murray Hill, N.J.

[21] Appl. No.: 770,057

[22] Filed: Oct. 2, 1991

[51] Int. Cl.[5] ............................................. H04J 14/02
[52] U.S. Cl. ................................... 359/124; 359/110; 370/16
[58] Field of Search ................ 359/124, 125, 126, 128, 359/133, 110, 154, 173, 114; 370/16; 340/825.03; 371/8.1, 8.2, 11.1, 11.2

[56] References Cited

U.S. PATENT DOCUMENTS

| 4,696,060 | 9/1987 | Oswald | 370/16 |
| 5,069,521 | 12/1991 | Hardwick | 370/16 |
| 5,077,729 | 12/1991 | Wong | 359/124 |

Primary Examiner—Edward L. Coles, Sr.
Assistant Examiner—Kinfe-Michael Negash
Attorney, Agent, or Firm—John C. Moran

[57] ABSTRACT

A duplicated transmission system in which two optical wavelengths are utilized on each of a pair of optical links with one optical wavelength communicating data and the other optical wavelength communicating a signal designating an active optical link of the pair. Each of the optical links is terminated on a transmit unit and a receive unit. The two transmit units determine which of the optical links is the active optical link, and each of the transmit units then transmits a signal on the second wavelength of the terminated optical link indicating this decision. The second wavelength of the active optical link designates that it is active, and the second wavelength of the standby optical link designates that it is the standby optical link. Upon reception of the information on the second wavelengths, the receive units both select the active optical link.

10 Claims, 3 Drawing Sheets

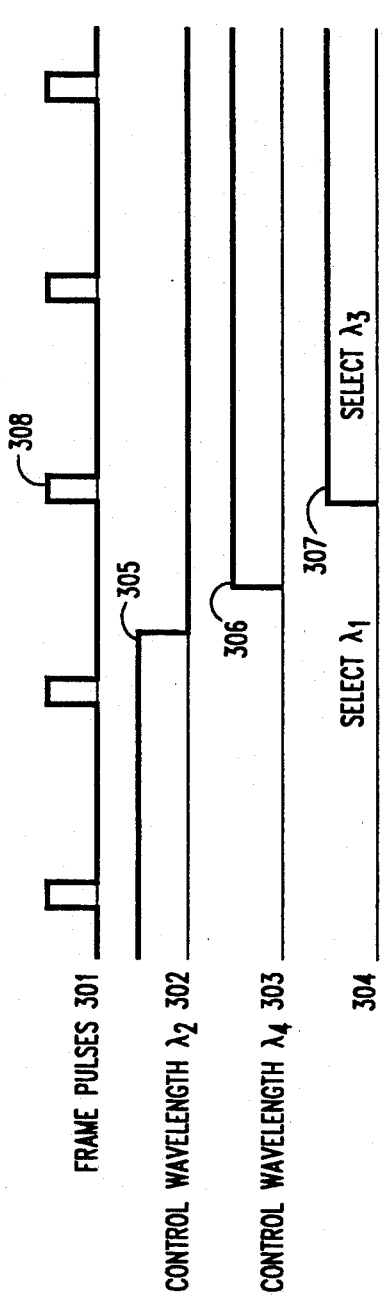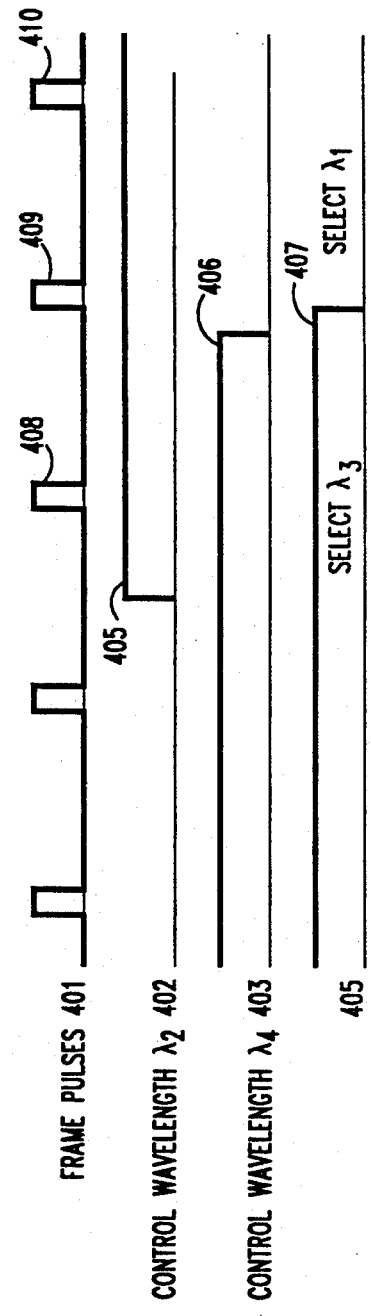

SELECTION OF TRANSMISSION FACILITIES USING OPTICAL WAVELENGTH DIVISION MULTIPLEXING

TECHNICAL FIELD

This invention relates to duplicated transmission facilities, and, in particular, to selection of an active transmission facility in a system having duplicated transmission facilities.

BACKGROUND OF THE INVENTION

The need to provide duplicated data transmission paths in telecommunication switching systems and computers is well known. One such system which utilizes duplicated data transmission paths to interconnect switching modules to a central switch is the AT&T 5ESS® switching system which is described in the AT&T Technical Journal, Volume 64, Jul.-Aug. 1985, No. 6, Part #2. In the 5ESS switching system, the switching modules are called time-slot interchangers (TSIs) and the central network is referred to as time-multiplexed switch (TMS). Each TSI is interconnected to the TMS by four optical links. One pair of optical links is used for transmission from the TSI to the TMS and the other pair of optical links is used for transmission from the TMS to the TSI. For either pair, one link of the pair is the active link, and the other link of the pair is the standby link. If the active link fails, the units use the standby link. In addition, during normal operation the TSI and the TMS alternate between which optical link is the standby and which link is the active. This control is performed by sending the control messages within data (in-band signaling) that is being transmitted over the active link. In-band signaling control suffers difficulties in synchronizing the transfer between the active and the standby. Further, if the active link fails, the control signal fails with it and switching to the standby link may be delayed since the loss of the control signal can only be checked for at predetermined intervals. This type of in-band signaling is also used in digital cross-connect systems (DCS).

In addition, it is known in the prior art to utilize separate transmission links for transmitting the control signals designating which of the duplicated links is to be active. This suffers from the problem of being expensive. For example, in the case of the 5ESS switching system, this would require the addition of four more optical links. Not only is the cost of optical links very expensive but often there is a large space penalty when the amount of cabling becomes excessive. This is particularly true in DCS systems which require a large number of links, and the ability to save four links on each duplicated bilateral path has an immense effect on the cost of the system plus the amount of physical space that is utilized by the system.

There exists a need in the prior art for providing control signals on each transmission path between two units to indicate which of the duplicated transmission paths is active by providing this within the transmission path without utilizing inband signaling.

SUMMARY OF THE INVENTION

The foregoing problems are solved, and a technical advance is achieved in accordance with the principles of this invention incorporated in a method and illustrative embodiments in which two optical wavelengths are utilized on each of a pair of optical links with one optical wavelength communicating data and the other optical wavelength communicating a signal designating the active optical link of the pair.

Each of the optical links is terminated on a transmit unit and a receive unit. The two transmit units determine which of the optical links is the active optical link, and each of the transmit units then transmits a signal on the second wavelength of the terminated optical link indicating this decision. The second wavelength of the active optical link designates that it is active, and the second wavelength of the standby optical link designates that it is the standby optical link. Upon reception of the information on the second wavelengths, the receive units both select the active optical link.

In an illustrative embodiment, each transmit unit wavelength division multiplexes the first and second wavelength together before transmission on the terminated optical link. Each receive unit splits the multiplexed wavelengths into two portions and sends one portion to the other receive unit. In response to the split multiplexed wavelengths from both optical links, each receive unit wavelength division demultiplexes the multiplexed wavelengths into first wavelengths and second wavelengths. Further, each receive unit converts the first wavelengths into control signals and the second wavelengths into two sets of data signals. A duplication control in each receive unit is responsive to the control signals to select one of the sets of data signals.

In another illustrative embodiment which differs from the previous embodiment in the following manner, each receive unit only converts the first wavelengths to electrical control signals, and a duplication control generates a select signal in response to the electrical control signals. An optical switch is responsive to the select signal to select one of the first wavelengths which is sequentially converted to electrical data. This embodiment is more economical because only one conversion is required of a second wavelength rather than two as is required in the first embodiment.

Other and further aspects of the present invention will become apparent during the course of the following description and by reference to the accompanying drawing.

BRIEF DESCRIPTION OF THE DRAWING

FIG. 2 illustrates a data selection table utilized to determine which of the optical links is active;

FIGS. 3 and 4 illustrate waveforms for two different cases involved in switching the standby optical link to the active optical link.

DETAILED DESCRIPTION

Figure 1:
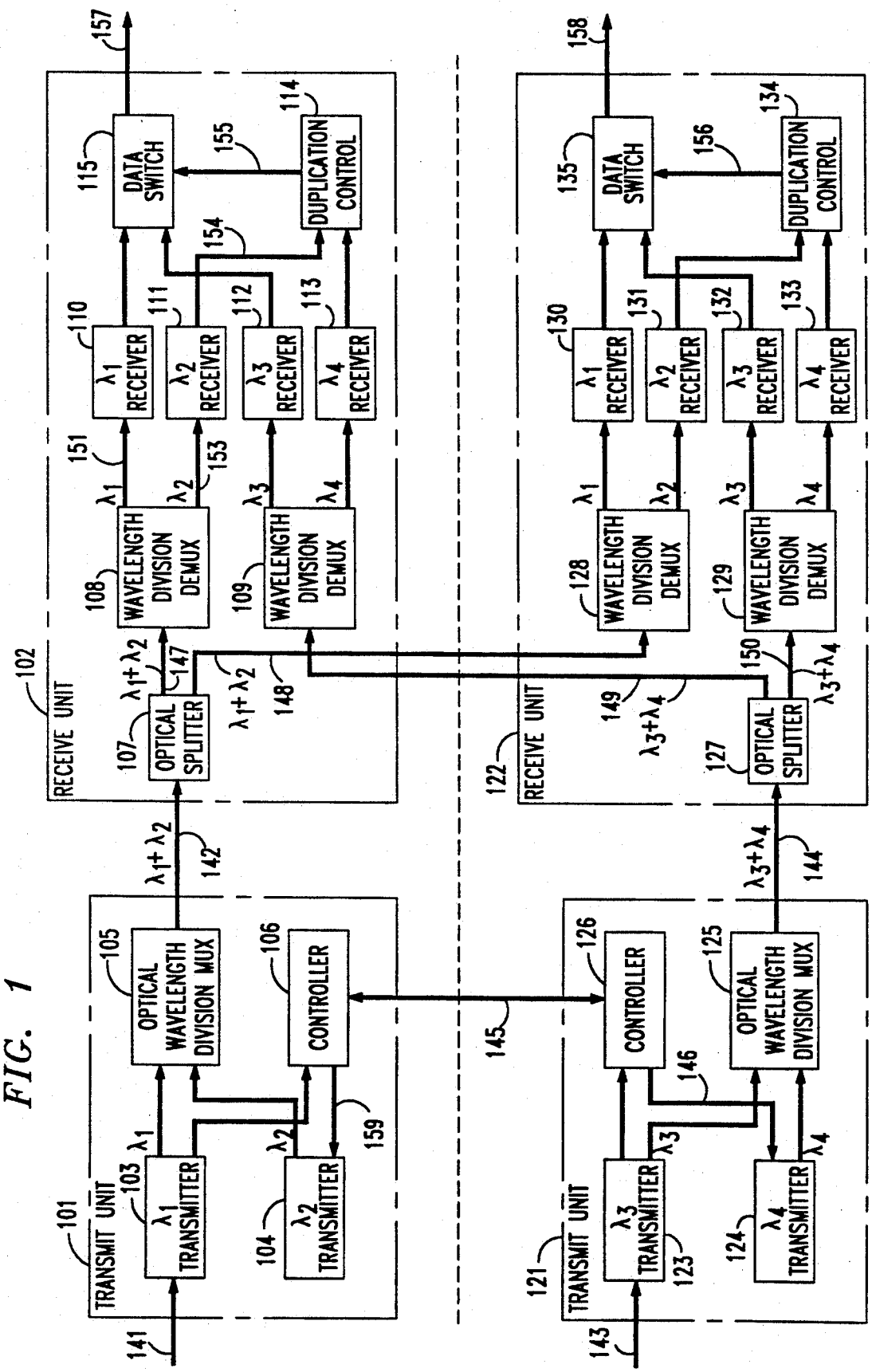
FIG. 1 illustrates a transmission system in accordance with the invention.

To achieve reliability, fully duplicated paths are used in the system of FIG. 1. Transmit unit 101 and receive unit 102 represent one of the duplicated entities, and transmit unit 121 and receive unit 122 represent the other duplicated entity. Transmit units 101 and 121 are responsive to data received on input paths 141 and 143 for transmitting this data out on optical links 142 and 144, respectively. Controllers 106 and 126 through intercommunication on path 145 determine which of the data streams is to be utilized by receive units 102 and 122. On links 142 and 144, data is transmitted by one optical wavelength with a control signal being transmitted on another optical wavelength to designate whether the data on optical path 142 or 144 is to be utilized by receive units 102 and 122.

Transmit unit 101 transmits the data on the $\lambda_1$ wavelength with control being transmitted on the $\lambda_2$ wavelength. Transmit unit 121 transmit data on the $\lambda_3$ wavelength with control being transmitted on the $\lambda_4$ wavelength. Advantageously in this embodiment, $\lambda_1$ and $\lambda_3$ are identical wavelengths as are $\lambda_2$ and $\lambda_4$. However, those skilled in the art could readily conceive of systems where these two pairs of wavelengths were not identical. Depending on the control signals from the control wavelengths $\lambda_2$ and $\lambda_4$, receive units 102 and 122 select either $\lambda_1$ or $\lambda_3$ wavelength to receive data and communicate the selected data to output conductor 157 or 158, respectively. The decision whether to use $\lambda_1$ or $\lambda_3$ wavelengths is made by duplication control 114 and 134 in receive units 102 and 122, respectively.

Consider the following example which assumes that optical link 142 is the active optical link. Controller 106 enables $\lambda_2$ transmitter 104 to transmit a "1" on $\lambda_2$ wavelength via conductor 159. Similarly, controller 126 enables $\lambda_4$ transmitter control 124 to transmit a "0" on $\lambda_4$ wavelength via conductor 146. Advantageously, "1" can be transmitted as the present of a steady or modulated optical signal, and a "0" can be transmitted as the absence of such a signal. Optical wavelength division multiplexer 105 is responsive to the outputs of transmitters 103 and 104 to wavelength division multiplex $\lambda_1$ and $\lambda_2$ wavelengths and to transmit these multiplexed wavelengths on optical link 142. Similarly, optical wavelength division multiplexer 125 is responsive to the outputs of transmitters 123 and 124 to wavelength division multiplex $\lambda_3$ and $\lambda_4$ wavelengths and to retransmit these multiplexed wavelengths on optical link 144.

Optical splitter 107 is responsive to these multiplexed wavelengths received via optical link 142 to optically split these multiplexed wavelengths sending a portion of these multiplexed wavelengths to wavelength division demultiplexer 108 via path 147 and another portion of these multiplexed wavelengths to wavelength division demultiplexer 128 via path 148. Similarly, optical splitter 127 sends a portion of the multiplexed wavelengths received from optical link 144 to wavelength division demultiplexer 109 via path 149 and another portion of the multiplexed wavelengths to wavelength division demultiplexer 129 via path 150.

Wavelength division demultiplexer 108 is responsive to multiplexed $\lambda_1$ and $\lambda_2$ wavelengths to communicate $\lambda_1$ wavelength to $\lambda_1$ receiver 110. The latter receiver converts $\lambda_1$ wavelength to electrical data signals and transmits these electrical data signals to data switch 115 via path 152. Similarly, wavelength division demultiplexer 108 transmits $\lambda_2$ wavelength to $\lambda_2$ receiver 111 via path 153. The latter receiver converts the optical wavelength to an electrical control signal and transmits the control signal to duplication control 114 via path 154. Wavelength division demultiplexer 109 performs similar functions with respect to $\lambda_3$ and $\lambda_4$ wavelengths in relationship to $\lambda_3$ receiver 112 and $\lambda_4$ receiver 113. Similar functions are performed by wavelength division demultiplexer 128, $\lambda_1$ receiver 130, $\lambda_2$ receiver 131, wavelength division demultiplexer 129, $\lambda_3$ receiver 132, and $\lambda_4$ receiver 133 with respect to data switch 135 and duplication control 134.

In the present example, duplication control 114 is receiving from $\lambda_2$ receiver 111 a control signal of "1" and from $\lambda_4$ receiver 113 a control signal of "0". FIG. 2 illustrates the logic used by duplication controls 114 and 134 in selecting the active optical link. Consequently, in accordance with FIG. 2, duplication control 114 instructs data switch 115 to select electrical data signals equivalent to $\lambda_1$ wavelength and to output the selected electrical data signals on path 157. Similarly, duplication control 134 instructs data switch 135 to select electrical data signals equivalent to $\lambda_1$ wavelength from $\lambda_1$ receiver 130 via path 156 and to communicate the selected electrical data signals on path 158.

Advantageously, $\lambda_1$, $\lambda_2$, $\lambda_3$, and $\lambda_4$ wavelengths are chosen to correspond to optical frequencies which can be economically generated and detected using devices appropriate for the communicated data. In preferred the embodiment for short and intermediate optical links (links of less than 5000 meters), $\lambda_1$ and $\lambda_3$ wavelengths are selected to be a long wavelength (approximately 1.3 to 1.5 microns) for high speed data transmission and low optical fiber loss, and $\lambda_2$ and $\lambda_4$ wavelengths are selected to be a shorter wavelength (approximately 0.8 microns) so that low cost transmitters and receivers can be used for operation at low speeds. For longer distances, $\lambda_2$ and $\lambda_4$ wavelengths would also be longer wavelengths for minimum attenuation.

FIGS. 3 and 4 illustrate another advantage of the present invention which is namely the fact that the control signals on $\lambda_2$ and $\lambda_4$ wavelengths do not have to be closely synchronized with the data being transmitted on $\lambda_1$ and $\lambda_3$ wavelengths. The data transmission is done on the basis of a frame with the start of each frame being designated by a frame pulse as illustrated on line 301 of FIG. 3. Duplication controls 114 and 134 only change their selection of data sources on the rising edge of a frame pulse. For example, in FIG. 3, even though the control signal on $\lambda_2$ wavelength transfers from a "1" to a "0" at time 305 and the control signal on $\lambda_4$ wavelength transfers from a "0" to a "1" at time 306, duplicated controls 114 and 134 do not select $\lambda_3$ wavelength until the rising edge of frame pulse 308 at time 307. This operation is in accordance with the data selection table illustrated in FIG. 2.

FIG. 4 illustrates another timing diagram to further illustrate the operation of duplication controls 114 and 134. Lines 401 through 405 illustrate similar wave forms as illustrated by lines 301 through 305 of FIG. 3. At time 405, the control signal on $\lambda_2$ wavelength goes from a "0" to a "1" state. However, since the control signal on $\lambda_4$ wavelength as illustrated on line 403 remains at the "1" state until time 406, the duplication units continue to select the electrical signals derived from data wavelength $\lambda_3$. At time 406, the control signal on $\lambda_4$ wavelength goes from a "1" state to a "0" state. Hence at time 407, duplicated controllers 114 and 134 select the data on wavelength $\lambda_1$. Note, at frame pulse 408, the control signals on $\lambda_2$ and $\lambda_4$ wavelengths are both "1" which by the data selection table of FIG. 2 is an indeterminate state, and duplicated controllers 114 and 134 continue to select the data on $\lambda_3$ wavelength.

Figure 5:
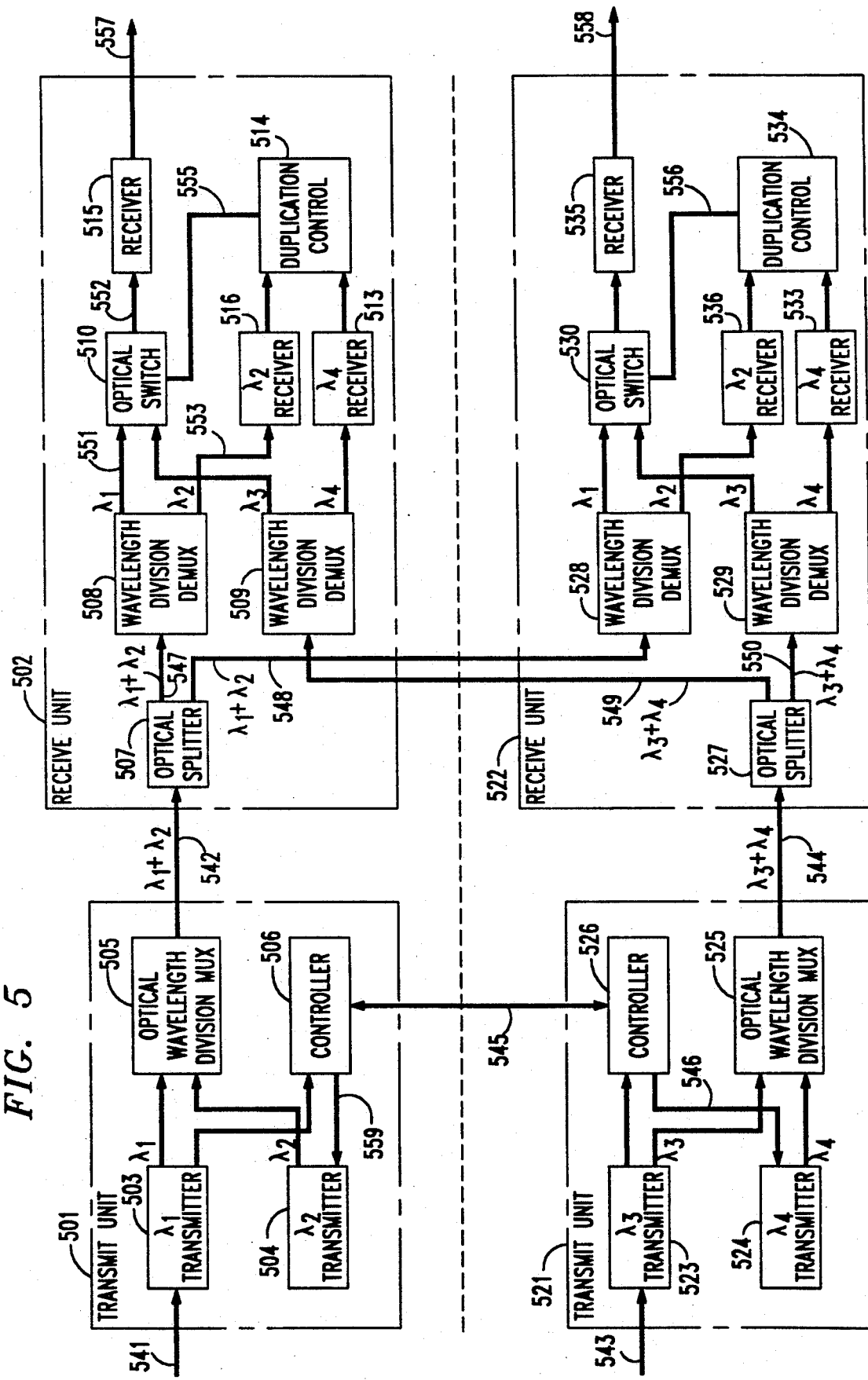
FIG. 5 illustrates another transmission system in accordance with the invention.

FIG. 5 illustrates a transmission system similar to that shown in FIG. 1; however, receive units 502 and 522 only require one high speed optical receiver for the reception of the wavelength communicating the data. This is accomplished by selecting the data wavelength by an optical switch. In FIG. 5, transmit units 501 and 521 perform the same functions as performed by transmit units 101 and 121 of FIG. 1. Also, in FIG. 5, elements 507 through 509 perform the same functions as performed by elements 107 through 109, and elements 513, 514, and 516 perform the same functions as performed by elements 113, 114, and 111. Elements 527 through 529, 533, 534, and 536 of FIG. 5 perform the same functions as the equivalent elements in FIG. 1. Consider now how the operation of receive unit 502 differs from that of receive unit 102. $\lambda_2$ and $\lambda_4$ wavelengths are converted by their respective receivers to electrical control signals, and these electrical control signals are transmitted to duplication control 514. Duplication control 514 functions in accordance with the logic given in FIG. 2 to control whether optical switch 510 selects $\lambda_1$ wavelength or $\lambda_3$ wavelength for communication via path 552 to optical receiver 515. The latter receiver converts $\lambda_1$ wavelength or $\lambda_3$ wavelength to electrical data signals and transmits these data signals on path 557. Optical switch 510 and receiver 515 replace the functions of data switch 115, $\lambda_1$ receiver 110, and $\lambda_3$ receiver 112. Receive unit 522 is configured in a manner similar to that of receive unit 502.

It is to be understood that the above-described embodiments are merely illustrative of the principles of the invention and that other arrangements may be devised by those skilled in the art without departing from the spirit and scope of the invention. In particular, one skilled in the art can readily devise a system where all four wavelengths are multiplexed on to one optical link and still have duplicated transmit units and duplicated receive units.

We claim:

1. An apparatus for controlling a duplicated transmission system comprising:
   a first and second optical link with the first optical link interconnecting a first transmit means and a first receive means and the second optical link interconnecting a second transmit means and a second receive means;
   the first and second transmit means transmitting on the first and second optical links, respectively, data using a first optical wavelength and a control signal using a second optical wavelength; and
   the first and second receive means each responsive to control signal communicated by the second optical wavelength of the first optical link and the control signal communicated by the second optical wavelength of the second optical link for selecting the first optical wavelength from the first optical link or the first optical wavelength from the second optical link.

2. The apparatus of claim 1 wherein the first and second transmit means each comprise means for combining said first and second optical wavelengths for transmission on the first and second optical links, respectively.

3. The apparatus of claim 2 wherein the first and second receive means each comprises means for splitting the first and second optical wavelengths communicated via the first and second optical links, respectively, into two portions;
   the first receive means further comprises means for communicating a portion of the first and second optical wavelengths received from the first optical link to the second receive means; and
   the second receive means further comprises means for communicating a portion of the first and second optical wavelengths received from the second optical link to the first receive means.

4. The apparatus of claim 3 wherein the first receive means further comprises means for demultiplexing the first and second optical wavelengths received from the first optical link and for converting the latter first and second optical wavelengths into data and control signals, respectively;
   the first receive means further comprises means for demultiplexing the first and second optical wavelengths of the portion communicated from the second receive means from each other and for converting the latter first and second optical wavelength to data and control signals, respectively;
   duplication control means responsive to the control signal recovered from the first optical link and the control signal recovered from the second optical link for generating a select control signal; and
   means responsive to the select control signal for selecting the data communicated via the first optical wavelength of the first optical link or via the first optical wavelength of the second optical link.

5. The apparatus of claim 3 wherein each of the first and second receive units further comprises:
   means for demultiplexing the first optical wavelengths from the second optical wavelengths;
   control means responsive to the second optical wavelengths received from the demultiplexing means for generating a switch control signal;
   means responsive to the control signal for optical selecting one of the first optical wavelengths; and
   means responsive to the selected first optical wavelength for converting the selected first optical wavelength to data signals.

6. A method for controlling a duplicated transmission system having a first and second optical link with the first optical link interconnecting a first transmitter and a first receiver and the second optical link interconnecting a second transmitter and a second receiver, comprising the steps of:
   transmitting on the first and second optical links, respectively, data using a first optical wavelength and a control signal using a second optical wavelength; and
   selecting by the first and second receivers the first optical wavelength from the first optical link or the first optical wavelength from second optical link in response to the control signal communicated by the second optical wavelength of the first optical link and the control signal communicated by the the second optical wavelength of the second optical link.

7. The method of claim 6 wherein the step of transmitting comprises the step of combining by the first and second transmitters said first and second optical wavelengths for transmission on the first and second optical links, respectively.

8. The method of claim 7 wherein the step of selecting comprises the steps of splitting the first and second optical wavelengths communicated via the first and second optical links, respectively, into two portions;
   communicating by the first receiver a portion of the first and second optical wavelengths received from the first optical link to the second receiver; and
   communicating by the second receiver a portion of the first and second optical wavelengths received from the second optical link to the first receiver.

9. The method of claim 8 wherein the step of selecting further comprises the steps of demultiplexing by the first receiver the first and second optical wavelengths received from the first optical link and converting the latter first and second optical wavelengths into data and control signals, respectively;

demultiplexing by the first receiver the first and second optical wavelengths of the portion communicated from the second receiver from each other and converting the latter first and second optical wavelength to data and control signals, respectively;

generating a select control signal by a duplicated controller in response to the control signal recovered from the first optical link and the control signal recovered from the second optical link; and selecting the data communicated via the first optical wavelength of the first optical link or via the first optical wavelength of the second optical link in response to the select control signal.

10. The method of claim 8 wherein the step of selecting further comprises the steps of demultiplexing the first optical wavelengths from the second optical wavelengths by each of the first and second receiver;

generating a switch control signal by a controller in response to the second optical wavelengths received from the demultiplexing step;

optical selecting one of the first optical wavelengths in response to the switch control signal; and converting the selected first optical wavelength to data signals in response to the selected first optical wavelength.

* * * * *